(12) United States Patent
Rogers

(10) Patent No.: US 7,911,963 B2
(45) Date of Patent: *Mar. 22, 2011

(54) EMPIRICAL SCHEDULING OF NETWORK PACKETS

(75) Inventor: Steven A Rogers, Portsmouth, NH (US)

(73) Assignee: NDS Imaging Holdings, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,929

(22) Filed: Apr. 29, 2009

(65) Prior Publication Data

US 2009/0207732 A1 Aug. 20, 2009

Related U.S. Application Data

(63) Continuation of application No. 10/663,378, filed on Sep. 17, 2003, now Pat. No. 7,529,247.

(51) Int. Cl.
*H04L 12/56* (2006.01)
(52) U.S. Cl. .................. 370/241; 370/356; 370/458
(58) Field of Classification Search .................. None
See application file for complete search history.

(56) References Cited

U.S. PATENT DOCUMENTS

| | | | |
|---|---|---|---|
| 4,745,593 A | 5/1988 | Stewart |
| 4,821,259 A | 4/1989 | DeBruler et al. |
| 5,271,000 A | 12/1993 | Engbersen et al. |
| 5,373,504 A | 12/1994 | Tanaka et al. |
| 5,408,465 A | 4/1995 | Gusella et al. |
| 5,432,775 A | 7/1995 | Crayford |
| 5,455,865 A | 10/1995 | Perlman |
| 5,477,531 A | 12/1995 | McKee et al. |
| 5,517,620 A | 5/1996 | Hashimoto et al. |
| 5,541,921 A | 7/1996 | Swenson et al. |
| 5,563,875 A | 10/1996 | Hefel et al. |
| 5,610,903 A | 3/1997 | Crayford |
| 5,734,656 A | 3/1998 | Prince et al. |
| 5,774,668 A | 6/1998 | Choquier et al. |
| 5,781,534 A | 7/1998 | Perlman et al. |
| 5,859,835 A | 1/1999 | Varma et al. |
| 5,859,979 A | 1/1999 | Tung et al. |
| 5,917,822 A | 6/1999 | Lyles et al. |
| 5,974,056 A | 10/1999 | Wilson et al. |
| 6,047,054 A | 4/2000 | Bayless et al. |

(Continued)

FOREIGN PATENT DOCUMENTS

EP 0827307 3/1998

(Continued)

OTHER PUBLICATIONS

Self-Adjusted Network Transmission for Multimedia Data; Mei-Ling Shyu, Shu-Ching Chen, Hongli Luo; Abstract; 6 pages.

(Continued)

*Primary Examiner* — Min Jung
(74) *Attorney, Agent, or Firm* — Banner & Witcoff, Ltd.

(57) ABSTRACT

A method of transmitting packets over a network includes steps of partitioning a packet delivery schedule into discrete time slots; transmitting a plurality of test packets from a first endpoint on the network to an intended recipient in the network using different time slots; evaluating the reliability of the network to transmit the plurality of test packets in each time slot; and selecting one or more time slots in the delivery schedule according to the evaluation step.

38 Claims, 7 Drawing Sheets

U.S. PATENT DOCUMENTS

| | | | |
|---|---|---|---|
| 6,058,117 A | 5/2000 | Ennamorato et al. | |
| 6,067,572 A | 5/2000 | Jensen et al. | |
| 6,088,361 A | 7/2000 | Hughes et al. | |
| 6,134,589 A | 10/2000 | Hultgren | |
| 6,201,791 B1* | 3/2001 | Bournas | 370/234 |
| 6,201,819 B1 | 3/2001 | Luders | |
| 6,208,666 B1 | 3/2001 | Lawrence et al. | |
| 6,240,084 B1 | 5/2001 | Oran et al. | |
| 6,247,061 B1 | 6/2001 | Douceur et al. | |
| 6,259,695 B1 | 7/2001 | Ofek | |
| 6,272,131 B1 | 8/2001 | Ofek | |
| 6,295,285 B1 | 9/2001 | Whitehead | |
| 6,359,885 B1 | 3/2002 | Kim et al. | |
| 6,360,271 B1 | 3/2002 | Schuster et al. | |
| 6,373,822 B1 | 4/2002 | Raj et al. | |
| 6,377,579 B1 | 4/2002 | Ofek | |
| 6,385,198 B1 | 5/2002 | Ofek et al. | |
| 6,426,814 B1 | 7/2002 | Berger et al. | |
| 6,426,944 B1 | 7/2002 | Moore | |
| 6,456,675 B2* | 9/2002 | Wagner et al. | 375/347 |
| 6,480,506 B1 | 11/2002 | Gubbi | |
| 6,487,593 B2* | 11/2002 | Banks | 709/224 |
| 6,496,477 B1 | 12/2002 | Perkins et al. | |
| 6,502,135 B1 | 12/2002 | Munger et al. | |
| 6,529,480 B1 | 3/2003 | Stewart et al. | |
| 6,556,564 B2 | 4/2003 | Rogers | |
| 6,560,222 B1 | 5/2003 | Pounds et al. | |
| 6,574,193 B1 | 6/2003 | Kinrot | |
| 6,611,519 B1 | 8/2003 | Howe | |
| 6,618,360 B1 | 9/2003 | Scoville et al. | |
| 6,618,761 B2 | 9/2003 | Munger et al. | |
| 6,628,629 B1 | 9/2003 | Jorgensen | |
| 6,633,544 B1 | 10/2003 | Rexford et al. | |
| 6,700,875 B1* | 3/2004 | Schroeder et al. | 370/252 |
| 6,711,137 B1 | 3/2004 | Klassen et al. | |
| 6,731,600 B1 | 5/2004 | Patel et al. | |
| 6,778,536 B1 | 8/2004 | Ofek et al. | |
| 6,791,997 B2 | 9/2004 | Beyer et al. | |
| 6,871,078 B2 | 3/2005 | Nishioka et al. | |
| 6,885,641 B1 | 4/2005 | Chan et al. | |
| 6,914,900 B1 | 7/2005 | Komatsu et al. | |
| 6,999,422 B2 | 2/2006 | Ishioka | |
| 7,080,160 B2 | 7/2006 | Cognet et al. | |
| 7,116,639 B1 | 10/2006 | Gail, Jr. et al. | |
| 7,187,669 B1* | 3/2007 | Lee | 370/347 |
| 7,197,010 B1 | 3/2007 | Berstein et al. | |
| 7,200,158 B2 | 4/2007 | Gustin | |
| 7,200,159 B2 | 4/2007 | Gronbach | |
| 7,468,948 B2* | 12/2008 | Rogers | 370/241 |
| 7,529,247 B2* | 5/2009 | Rogers | 370/395.2 |
| 2001/0033565 A1 | 10/2001 | Rogers | |
| 2001/0033649 A1 | 10/2001 | Rogers | |
| 2002/0010792 A1 | 1/2002 | Border et al. | |
| 2002/0031144 A1 | 3/2002 | Barton | |
| 2002/0044557 A1 | 4/2002 | Isoyama | |
| 2002/0054611 A1 | 5/2002 | Seta | |
| 2002/0075891 A1 | 6/2002 | Souissi | |
| 2002/0080719 A1 | 6/2002 | Parkvall et al. | |
| 2002/0086641 A1 | 7/2002 | Howard | |
| 2002/0110129 A1 | 8/2002 | Matsuoka et al. | |
| 2002/0186660 A1 | 12/2002 | Bahadiroglu | |
| 2002/0191592 A1 | 12/2002 | Rogers et al. | |
| 2003/0012163 A1 | 1/2003 | Cafarelli et al. | |
| 2003/0021287 A1 | 1/2003 | Lee et al. | |
| 2003/0058880 A1 | 3/2003 | Sarkinen et al. | |
| 2003/0067903 A1 | 4/2003 | Jorgensen | |
| 2003/0107991 A1 | 6/2003 | Tezuka et al. | |
| 2003/0117959 A1 | 6/2003 | Taranov | |
| 2003/0188188 A1 | 10/2003 | Padmanabhan et al. | |
| 2003/0208729 A1 | 11/2003 | Giddens et al. | |
| 2003/0219029 A1 | 11/2003 | Pickett | |
| 2004/0008655 A1 | 1/2004 | Park et al. | |
| 2004/0014491 A1 | 1/2004 | Weigand | |
| 2004/0024550 A1 | 2/2004 | Doerken et al. | |
| 2004/0100929 A1 | 5/2004 | Garcia-Luna-Aceves | |
| 2004/0160340 A1 | 8/2004 | Thomson et al. | |
| 2004/0160916 A1 | 8/2004 | Vukovic et al. | |
| 2004/0179530 A1 | 9/2004 | Verbesselt et al. | |
| 2005/0058083 A1 | 3/2005 | Rogers | |
| 2005/0086362 A1 | 4/2005 | Rogers | |
| 2005/0088362 A1 | 4/2005 | Lin et al. | |
| 2005/0097619 A1 | 5/2005 | Haddad | |
| 2006/0045100 A1 | 3/2006 | Klausberger et al. | |
| 2006/0168336 A1 | 7/2006 | Koyanagi et al. | |
| 2009/0141626 A1* | 6/2009 | Rogers | 370/230 |

FOREIGN PATENT DOCUMENTS

| | | |
|---|---|---|
| JP | 04-056322 | 2/2004 |
| WO | 00/28705 | 5/2000 |
| WO | 00/28706 | 5/2000 |
| WO | 01/47162 | 6/2001 |
| WO | 01/50146 | 7/2001 |
| WO | 01/59994 | 8/2001 |
| WO | 01/60029 | 8/2001 |
| WO | 0225821 A1 | 3/2002 |
| WO | 02/41505 | 5/2002 |
| WO | 02/100023 A2 | 12/2002 |
| WO | 02/100023 A3 | 12/2002 |
| WO | 03/084137 | 10/2003 |

OTHER PUBLICATIONS

The Problem of Upstream Traffic Synchronization in Passive Optical Networks; Glen Kramer; Abstract pp. 1-7.

Distributed Path Reservation Algorithms for Multiplexed all-Optical Interconnection Networks; X. Yuan, R. Melhem and R. Gupta; Abstract; 10 Pages.

The Desk Area Network; Mark Hayter and Derek McAuley; May 1991; Abstract pp. 11.

Business Communications Review; Sep. 2003; "Circuit-y New Choices for IP Networks" pp. 18-24.

IEEE Communications Magazine Oct. 2003; Topics in Internet Technology: "Packet Sequencing: a Demterministic Protocol for QoS in IP Networks" Sean S.B. Moore and Curtis A. Siller, Jr., Cetacean Networks, Inc.' pp. 98-107.

Packet Sequencing: A layer—2 Wan Switching Technology for Per-Flow Ideal QoS and Secure IP Networking; Steven A. Rogers, Sean S.B. Moore and Curtis A. Siller, Jr.; Abstract pp. 1-6.

Cetacean Networks; www.cetacean.com "Cost-Effective IP Networks for High Quality Videoconferencing" Nov. 2002; pp. 1-9.

Copyright @ 2003, Cetacean Networks, Inc.; A Deterministic Protocol for QoS in IP Networks Packet Sequencing; Steven A. Rogers, Sean S.B. Moore, Ph.D. and Curtis A. Siller, Jr., Ph.D.; Abstract pp. 1-18.

Copyright @ 2002, Cetacean Networks, Inc.; IP Videoconferencing Solution Performance: Packet Sequencing vs. Prioritization; pp. 1-8.

Copyright @ 2003; MultiService Converged IP Networks; Sean S.B. Moore, Ph.D.; Cetacean Networks, Inc.: pp. 1-10.

Copyright @ 2001; Practical Limits on Network Utilization in Converged IP Networks; Sean S.B. Moore, Ph.D.; Cetacean Networks, Inc.: pp. 1-2.

Clark, M; Jeffay, K; Application—level Measurements of Performance on the vBNS Multimedia Computing and Systems, 1999. IEEE International Conference on Jun. 1999, vol. 2, 7-11, pp. 362-366 vol. 2.

Yi Du and Gerald M. Mason, "Enhancing accuracy of probe packet-based congestion detection in high speed Networks", IEEE 1998.

PCT International Search Report dated May 24, 2006.

Official Communication, AU 2004275282 mail date Sep. 2, 2009.

Official Communication, CA 2,538,751; Mail Date Feb. 11, 2010.

* cited by examiner

EMPIRICAL SCHEDULING OF NETWORK PACKETS

CROSS-REFERENCE TO RELATED APPLICATIONS

This is a continuation of U.S. Ser. No. 10/663,378, filed on Sep. 17, 2003, now U.S. Pat. No. 7,529,247, the contents of which are incorporated herein by reference.

BACKGROUND OF THE INVENTION

The present invention relates generally to a system for allowing devices connected to a network (e.g., an IP or Ethernet network) to collaborate with other such devices so as to transmit and receive data packets without impairment on the network As is generally known, Ethernet and Internet Protocol (IP) are systems for transmitting packets between different points on a communications network. These switching systems are known as "contention-based" systems. That is, all transmitters contend for network resources. All transmitters may transmit simultaneously. If they do, then network resources may be oversubscribed. When this happens, data may be delayed or lost, resulting in network impairment.

As illustrated in FIG. 1, four streams of packets are input to a packet switch 112, which routes the packets to one or more outputs based on addressing information contained in each packet. Packets may arrive at the switch at unpredictable times, leading to bursts of inputs that must be handled. The switch typically maintains a packet queue 114 that is able to store a small number of packets. The queue may comprise multiple queues arranged by packet priority level, such that priority 3 packets, for example, take precedence over priority 1 packets. If the inputs are too bursty, the queues fill up and some packets may be discarded. The higher-priority queues are typically emptied before the lower-priority queues, such that the lower-priority queues are more likely to lose data first.

IP systems suffer from impairments such as packet loss and jitter. This happens because there is no control over how many such packets reach a router at any given instant. If two packets arrive at a router at the same time, destined for the same port, one will have to be delayed. Both cannot be transmitted simultaneously. One of the packets will be saved in the queue until the first packet is completely transmitted.

FIG. 2 shows a computer network comprising endpoints 100, 101, 102, and 103. The network includes routers 104 through 107. As can be seen in the figure, if endpoints 100 and 101 communicate with endpoints 102 and 103 at the same time, a bottleneck may develop between routers 105 and 106. This may occur because too many packets may be simultaneously transmitted between the routers, causing the routers to discard overflow packets. This can happen even at low levels of network utilization.

Various methods have been developed to overcome data loss on Ethernet and IP networks. The primary approach has been to use additional protocols to replace lost data. This is an after-the-fact solution. An example is the well-known Transmission Control Protocol (TCP). TCP is able to detect data loss and it causes retransmission of the data, until a perfect copy of the complete data file is delivered to the recipient device.

Many devices may be unable to use TCP or any retransmission method because it is far too slow. Real-time applications require delivery of data, accurately, the first time. For these applications to operate well, even the speed of light causes undesired delay. It is not feasible or desirable to add retransmission delay.

The problem is determining how to provide reliable, first-time delivery on a contention-based network. Various approaches have been tried. The most commonly proposed system relies on prioritization of data in the network. With this approach, data having real-time constraints is identified with priority coding so that it may be transmitted before other data.

Prioritization seems at first to be a good solution. However, on reflection it suffers from the same difficulty. Prioritization only provides a delivery advantage relative to the lower-priority data. It provides no advantage against the other priority data. Analysis and testing shows that this approach can work in certain circumstances, but only when the amount of priority data is small. For simple applications like voice, the percentage of the total may need to be 8% or less. Other applications must occupy an even smaller percentage of total network resource. As shown in FIG. 1, even high-priority packets may be discarded if too many high-priority packets are transmitted within a short time interval. For many networks this makes prioritization impractical.

Another approach is to multiplex the data. With this method the bursts of data associated with one flow of data are separated from the burst of another. Multiplexing usually uses some type of time-domain system (known as Time Domain Multiplexing (TDM)) to separate flows. Flows may be separated in groups, so that one group does not contend with another group. This can be an improvement but still leaves the possibility of contention between groups. The only way to eliminate contention is to multiplex each flow individually. A central problem with multiplexing is that it eliminates a principal advantage of the network, namely that average bandwidth available to all is reduced. In other words, each potential transmitter on the network is guaranteed a slot of time on the network, even if that time is infrequently used. This leads to inefficient resource usage.

Asynchronous Transfer Mode (ATM) is another technology for multiplexing a data network, to reduce contention. ATM breaks all data flows into equal length data blocks. Further, ATM can limit the number of data blocks available to any flow or application. The result is a virtual TDM multiplex system.

Both TDM and ATM provide contention reduction, but at the cost of considerable added complexity, cost, components, and lost bandwidth performance. Other approaches rely on specialized hardware to schedule packet delivery, driving up hardware costs.

SUMMARY OF THE INVENTION

The invention overcomes many of the above-identified disadvantages by providing an empirically determined delivery schedule for packets that are to be delivered between two endpoints on the network. A transmitting node having the need to transmit packets according to a known data rate (e.g., to support a voice telephone call) transmits a series of test packets over the network to the intended recipient using different delivery times. The test packets are evaluated to determine which of the delivery times suffered the least latency and/or packet loss, and that delivery time is used to schedule the packets for the duration of the transmission. Other endpoints use a similar scheme, such that each endpoint is able to evaluate which delivery schedule is best suited for transmitting packets with the least likely packet loss and latency. Different priority levels are used to transmit the data; the test packets; and other data in the network. The system empirically determines a desirable time schedule for transmission of data packets between two endpoints on the network. The delivery scheme can be implemented without specialized hardware.

DETAILED DESCRIPTION OF THE INVENTION

Figure 1:
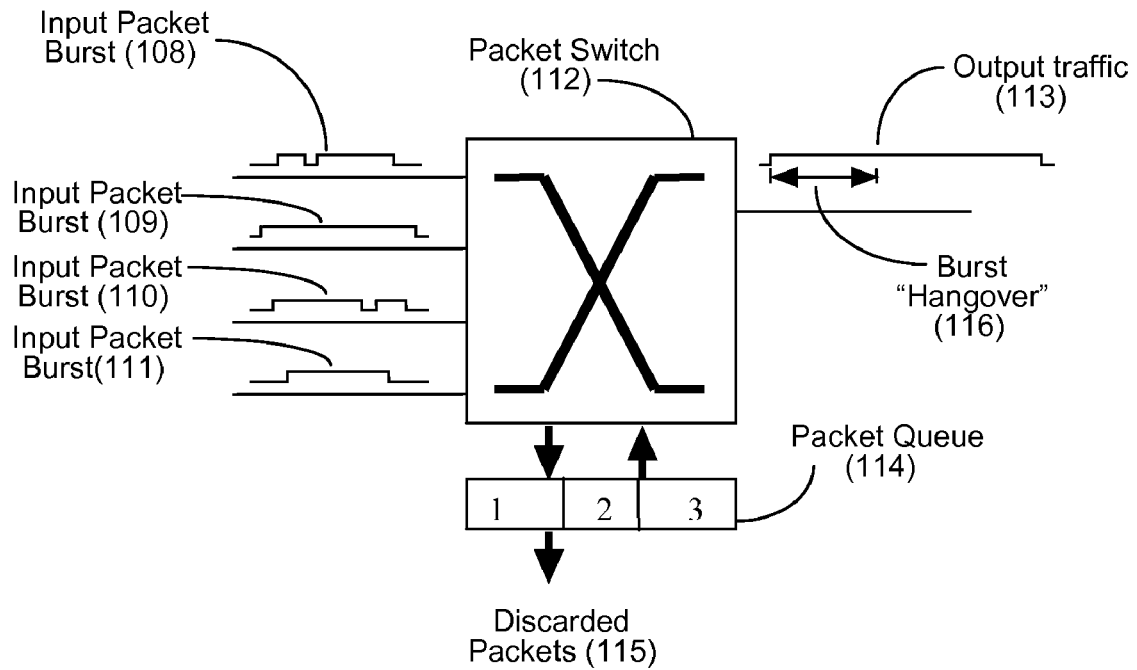
FIG. 1 shows the problem of bursty packets creating an overflow condition at a packet switch, leading to packet loss.
Figure 2:
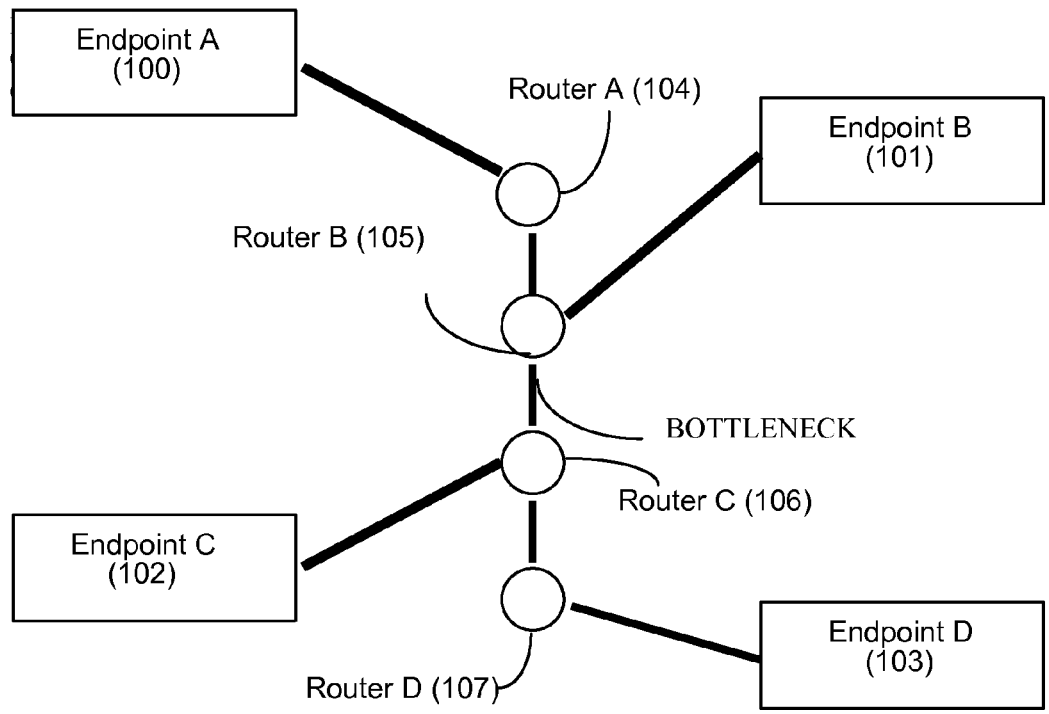
FIG. 2 shows how network congestion can lead to a bottleneck where two sets of endpoints share a common network resource under bursty conditions.
Figure 3:
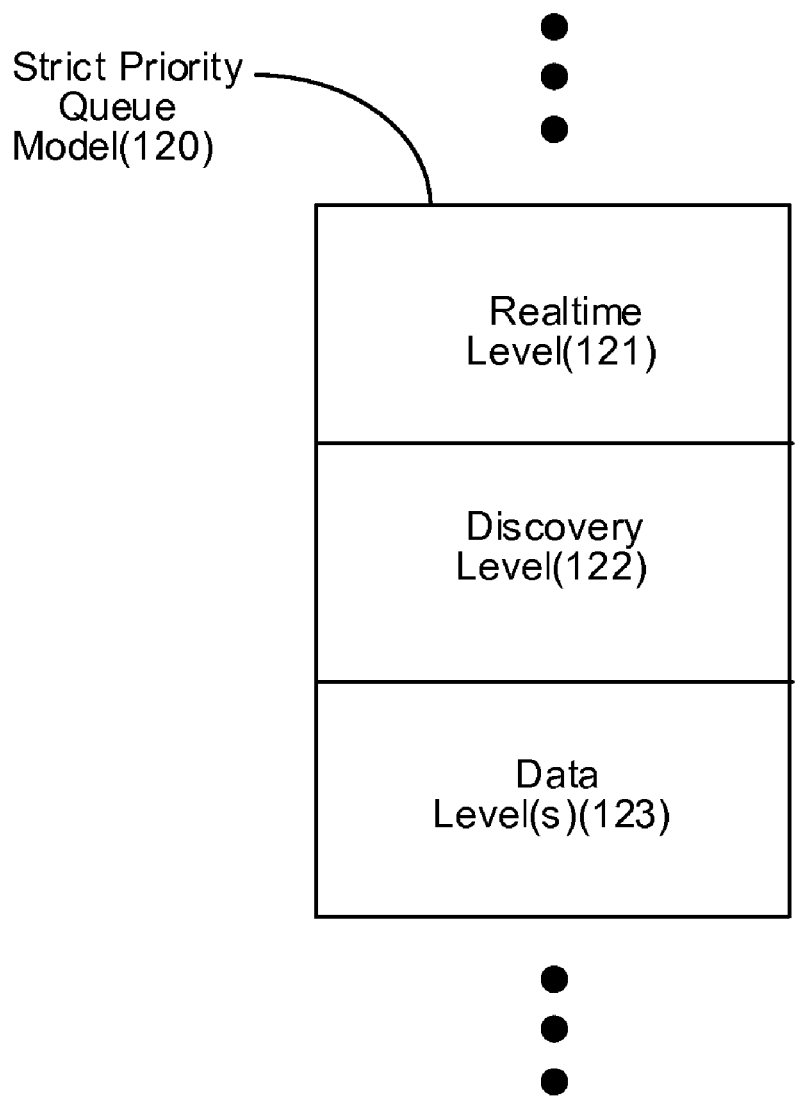
FIG. 3 shows one approach for assigning different priority levels to scheduled data (realtime level); test packets (discovery level); and other network traffic (data level).

According to one variation of the invention, a priority scheme is used to assign priority levels to data packets in a network such that delivery of packets intended for real-time or near real-time delivery (e.g., phone calls, video frames, or TDM data packets converted into IP packets) are assigned the highest priority in the network. A second-highest priority level is assigned to data packets that are used for testing purposes (i.e. the so-called test packets). A third-highest priority level is assigned to remaining data packets in the system, such as TCP data used by web browsers. FIG. 3 illustrates this scheme. These priority levels can be assigned by enabling the packet priority scheme already available in many routers.

Other priority levels above and below these three levels can be accommodated as well. For example, a priority level above the real-time level can be assigned for emergency purposes, or for network-level messages (e.g., messages that instruct routers or other devices to perform different functions).

Figure 4:
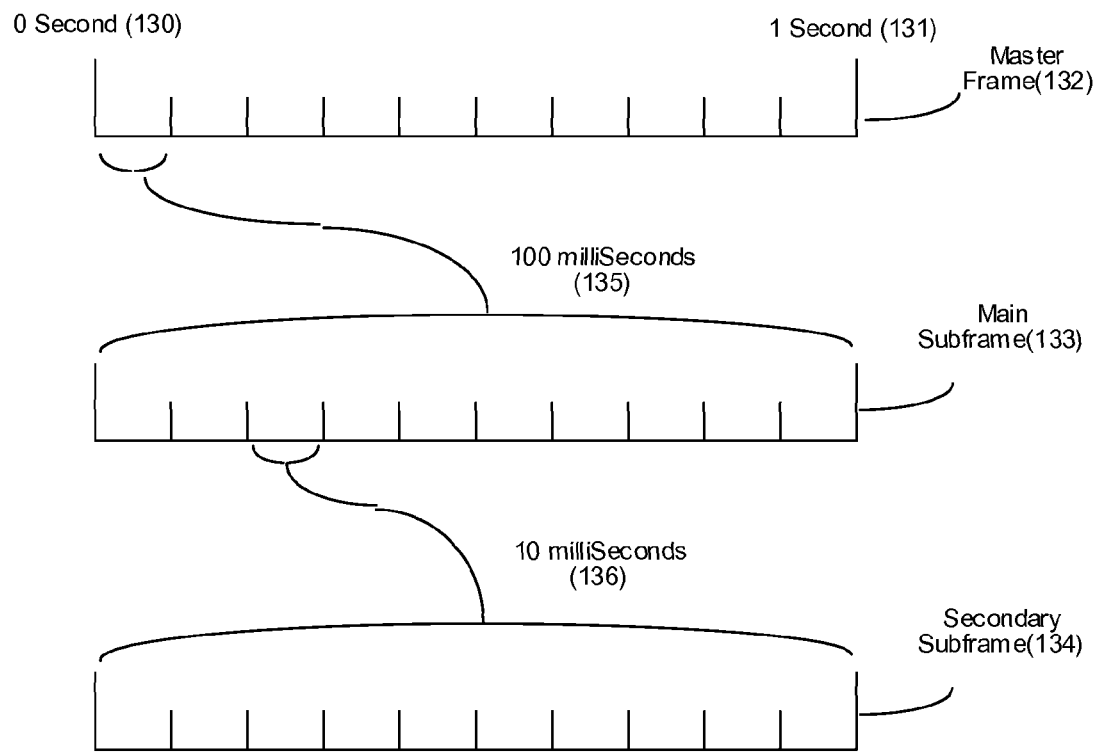
FIG. 4 shows a frame structure in which a delivery schedule can be decomposed into a master frame; subframes; and secondary subframes.

FIG. 4 shows how an arbitrary delivery time period of one second (a master frame) can be decomposed into subframes each of 100 millisecond duration, and how each subframe can be further decomposed into secondary subframes each of 10 millisecond duration. Each secondary subframe is in turn divided into time slots of 1 millisecond duration. According to one variation of the invention, the delivery time period for each second of transmission bandwidth is decomposed using a scheme such as that shown in FIG. 4 and packets are assigned to one or more time slots according to this schedule for purposes of transmitting test packets and for delivering data using the inventive principles. In this sense, the scheme resembles conventional TDM systems. However, unlike TDM systems, no endpoint can be guaranteed to have a particular timeslot or timeslots. Instead, nodes on the network transmit using timeslots that are empirically determined to be favorable based on the prior transmission of test packets between the two endpoints.

Figure 5:
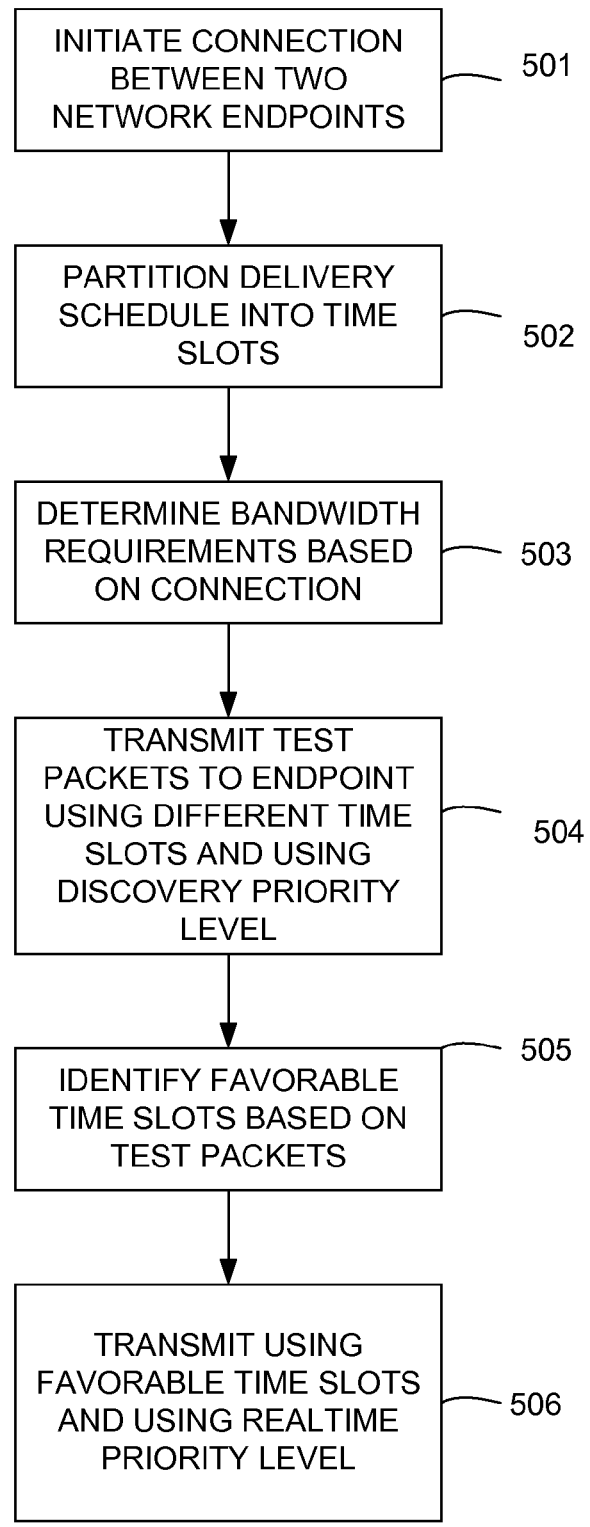
FIG. 5 shows a flow chart having steps for carrying out various principles of the invention.

FIG. 5 shows method steps that can be used to carry out the principles of the invention. Beginning in step 501, a determination is made that two endpoints on the network (e.g., and Ethernet network or an IP network) desire to communicate. This determination may be the result of a telephone receiver being picked up and a telephone number being dialed, indicating that two nodes need to initiate a voice-over-IP connection. Alternatively, a one-way connection may need to be established between a node that is transmitting video data and a receiving node. Each of these connection types can be expected to impose a certain amount of data packet traffic on the network. For example, a voice-over-IP connection may require 64 kilobits per second transfer rate using 80-byte packet payloads (not including packet headers). A video stream would typically impose higher bandwidth requirements on the network.

Note that for two-way communication, two separate connections must be established: one for node A transmitting to node B, and another connection for node B transmitting to node A. Although the inventive principles will be described with respect to a one-way transmission, it should be understood that the same steps would be repeated at the other endpoint where a two-way connection is desired.

In step 502, a delivery schedule is partitioned into time slots according to a scheme such as that illustrated in FIG. 4. (This step can be done in advance and need not be repeated every time a connection is established between two endpoints). The delivery schedule can be derived from a clock such as provided by a Global Positioning System (GPS). As one example, an arbitrary time period of one second can be established for a master frame, which can be successively decomposed into subframes and secondary subframes, wherein each subframe is composed of 10 slots each of 10 milliseconds in duration and each secondary subframe is compose of 10 slots each of 1 millisecond in duration. Therefore, a period of one second would comprise 1,000 slots of 1 millisecond duration. Other time periods could of course be used, and the invention is not intended to be limited to any particular time slot scheme.

In step 503, the required bandwidth between the two endpoints is determined. For example, for a single voice-over-IP connection, a bandwidth of 64 kilobits per second might be needed. Assuming a packet size of 80 bytes or 640 bits (ignoring packet overhead for the moment), this would mean that 100 packets per second must be transmitted, which works out to (on average) a packet every 10 milliseconds. Returning to the example shown in FIG. 4, this would mean transmitting a packet during at least one of the slots in the secondary subframe at the bottom of the figure. (Each slot corresponds to one millisecond).

In step 504, a plurality of test packets are transmitted during different time slots at a rate needed to support the desired bandwidth. Each test packet is transmitted using a "discovery" level priority (see FIG. 3) that is higher than that accorded to normal data packets (e.g., TCP packets) but lower than that assigned to realtime data traffic (to be discussed below). For example, turning briefly to FIG. 6, suppose that the schedule has been partitioned into one millisecond time slots. The test packets might be transmitted during time slots 1, 3, 5, 7, 9, 11, and 12 as shown. Each test packet preferably contains the "discovery" level priority; a timestamp to indicate when the packet was sent; a unique sequence number from which the packet can be identified after it has been transmitted; and some means of identifying what time slot was used to transmit the packet. (The time slot might be inferred from the sequence number). The receiving endpoint upon receiving the test packets returns the packets to the sender, which allows the sender to (a) confirm how many of the sent packets were actually received; and (b) determine the latency of each packet. Other approaches for determining latency can of course be used. The evaluation can be done by the sender, the recipient, or a combination of the two.

In step 506, the sender evaluates the test packets to determine which time slot or slots are most favorable for carrying out the connection. For example, if it is determined that packets transmitted using time slot #1 suffered a lower average dropped packet rate than the other slots, that slot would be preferred. Similarly, the time slot that resulted in the lowest packet latency (round-trip from the sender) could be preferred over other time slots that had higher latencies. The theory is that packet switches that are beginning to be stressed would have queues that are beginning to fill up, causing increases in latency and dropped packets. Accordingly, according to the inventive principles other time slots could be used to avoid transmitting packets during periods that are likely to increase queue lengths in those switches. In one variation, the time slots can be "overstressed" to stretch the system a bit. For example, if only 80-byte packets are actually needed, 160-byte packets could be transmitted during the test phase to represent an overloaded condition. The overloaded condition might reveal bottlenecks where the normal 80-byte packets might not.

Rather than the recipient sending back time-stamped packets, the recipient could instead perform statistics on collected test packets and send back a report identifying the latencies and dropped packet rates associated with each time slot.

As explained above, packet header overhead has been ignored but would typically need to be included in the evaluation process (i.e., 80-byte packets would increase by the size of the packet header). Slot selection for the test packets could be determined randomly (i.e., a random selection of time slots could be selected for the test packets), or they could be determined based on previously used time slots. For example, if a transmitting node is already transmitting on time slot 3, it would know in advance that such a time slot might not be a desirable choice for a second connection. As another example, if the transmitting node is already transmitting on time slot 3, the test packets could be transmitted in a time slot that is furthest away from time slot 3, in order to spread out as much as possible the packet distribution.

In step 506, a connection is established between the two endpoints and packets are transmitted using the higher "realtime" priority level and using the slot or slots that were determined to be more favorable for transmission. Because the higher priority level is used, the connections are not affected by test packets transmitted across the network, which are at a lower priority level. In one variation, the IP precedence field in IP packet headers can be used to establish the different priority levels.

Figure 6:
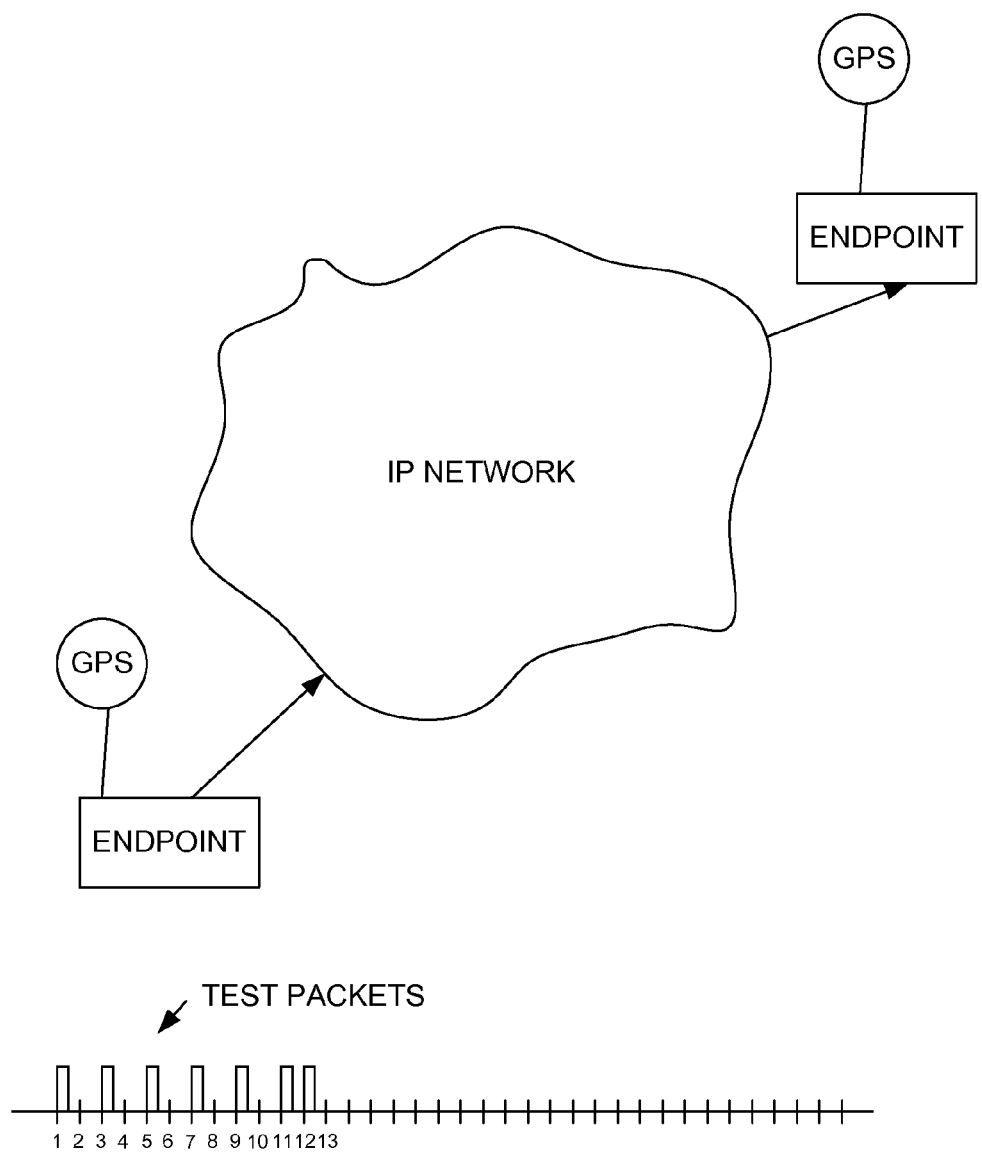
FIG. 6 shows a system using a delivery schedule for test packets from a first endpoint to a second endpoint.

FIG. 6 shows a system employing various principles of the invention. As shown in FIG. 6, two endpoints each rely on a GPS receiver for accurate time clock synchronization (e.g., for timestamping and latency determination purposes). The IP network may be comprised of a plurality of routers and/or other network devices that are able to ultimately route packets (e.g., IP or Ethernet packets) from one endpoint to the other. It is assumed that the organization configuring the network has the ability to control priority levels used on the network, in order to prevent other nodes from using the discovery priority level and realtime priority level.

It should be appreciated that rather than transmitting test packets simultaneously during different time slots, a single slot can be tested, then another slot, and so on, until an appropriate slot is found for transmission. This would increase the time required to establish a connection. Also, as described above, for a two-way connection, both endpoints would carry out the steps to establish the connection.

It should also be understood that the phase of all frames may be independent from one another; they need only be derived from a common clock. Different endpoints need not have frames synchronized with each other. Other approaches can of course be used.

The invention will also work with "early discard" settings in router queues since the empirical method would detect that a discard condition is approaching.

In another variation, packet latencies and packet dropped rates can be monitored during a connection between endpoints and, based on detecting a downward trend in either parameter, additional test packets can be transmitted to find a better time slot in which to move the connection.

Figure 7:
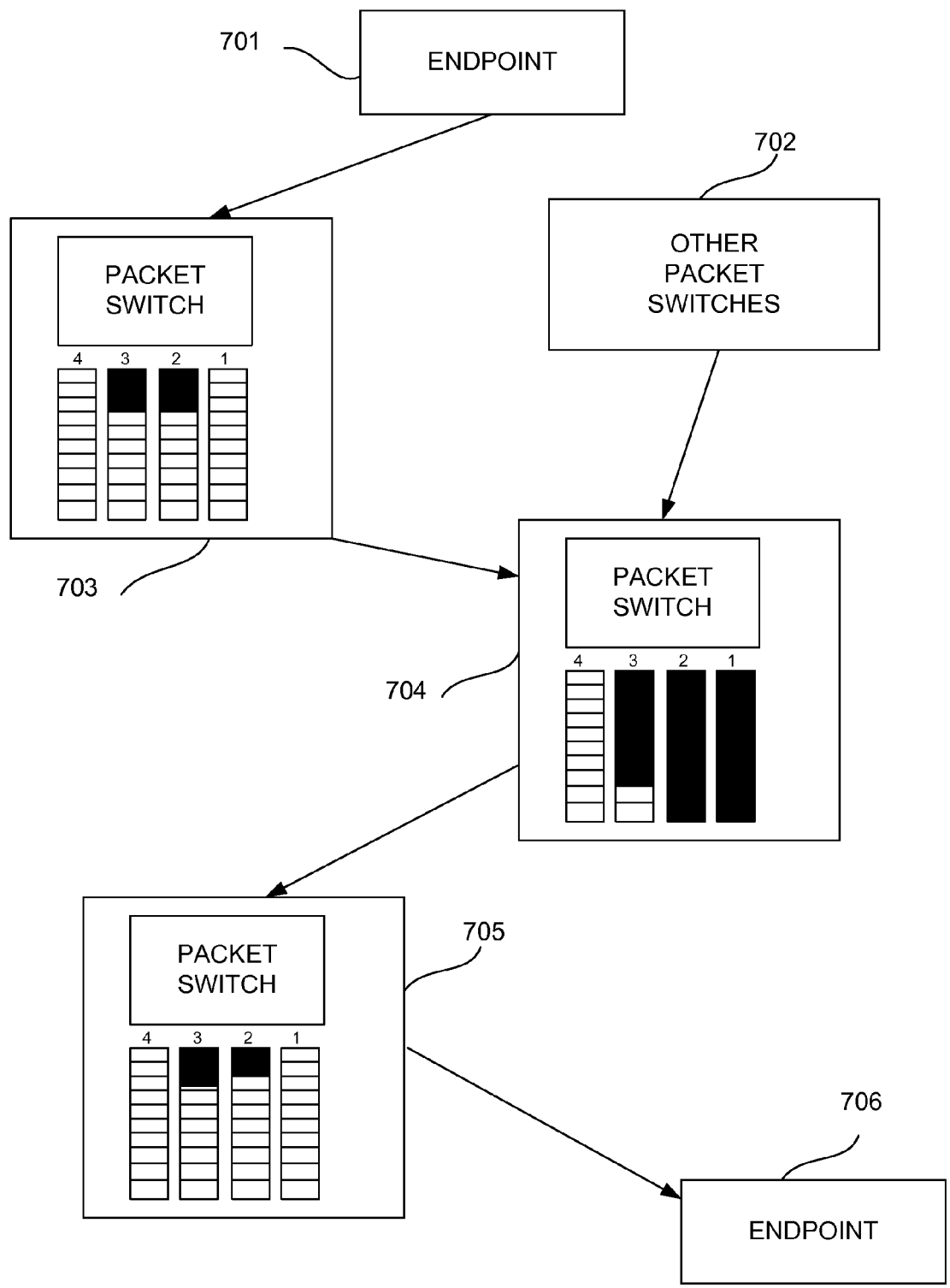
FIG. 7 shows a system wherein queues for realtime traffic (priority 3) are nearly full at one packet switch and yet the traffic still gets through the network.

FIG. 7 shows a system in which a first endpoint 701 communicates with a second endpoint 706 through a plurality of packet switches 703 through 705. Each packet switch maintains a plurality of packet queues. For illustrative purposes, four different priority levels are shown, wherein 4 is the highest level, and level 1 is the lowest level. Assume that endpoint 701 attempts to initiate a connection with endpoint 706 through the network. Endpoint 701 transmits a plurality of "test" packets using priority level 2. As can be seen, packet switch 703 is lightly loaded and the queues have no difficulty keeping up with the traffic.

Packet switch 704, however, is heavily loaded. In that switch, the queue for priority level 1 traffic is full, leading to dropped packets and latencies. Similarly, the test packets transmitted by endpoint 701 at priority level 2 cause that queue to overflow, causing dropped packets and longer latencies. However, the priority level 3 queue (existing realtime traffic) is not yet full, so those packets are transported through the network unaffected. In accordance with the invention, upon detecting that test packets sent during certain time slots are dropped and/or suffer from high latencies, endpoint 701 selects those time slots having either the lowest drop rate and/or the lowest latencies, and uses those time slots to schedule the packets (which are then transmitted using level 3 priority).

It is assumed that each endpoint in FIG. 7 comprises a node (i.e., a computer having a network interface) including computer-executable instructions for carrying out one or more of the above-described functions.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer, and such computer-readable media is included within the scope of the intended invention. Numbering associated with process steps in the claims is for convenience only and should not be read to imply any particular ordering or sequence.

I claim:

1. A method of transmitting packets over a packet-switched network, comprising the steps of:

(1) transmitting a plurality of test packets over a single network path of the packet-switched network between a first network endpoint and a second network endpoint during a plurality of different delivery times, each delivery time corresponding to a candidate time within a time reference frame during which a packet can be transmitted from the first network endpoint to the second network endpoint;

(2) empirically determining on the basis of packet statistics of the test packets which of the plurality of different delivery times corresponds to favorable traffic conditions for transmitting packets between the first network endpoint and second network endpoint over the single network path of the packet-switched network; and (3) scheduling data packets for delivery over the network from the first network endpoint to the second network endpoint during one or more delivery times empirically determined in step (2) to correspond to favorable traffic conditions.

2. The method of claim 1, wherein the test packets have characteristics emulating data packets that will be transmitted between the first network endpoint and the second network endpoint.

3. The method of claim 1, wherein step (2) comprises the step of evaluating packet latencies associated with the test packets.

4. The method of claim 1, wherein step (2) comprises the step of evaluating dropped packet rates associated with the test packets.

5. The method of claim 1, wherein step (1) comprises the step of transmitting the test packets at a data rate corresponding to an expected connection bandwidth between the first network endpoint and the second network endpoint.

6. The method of claim 1, wherein step (2) comprises the step of the first network endpoint performing an evaluation of packet statistics associated with the test packets transmitted over the plurality of different delivery times.

7. The method of claim 1, wherein step (1) comprises the step of transmitting the test packets at a priority level lower than a priority level of existing real-time data traffic on the packet-switched network.

8. The method of claim 1, wherein the test packets and the data packets comprise Internet Protocol (IP) packets transmitted over the packet-switched network.

9. The method of claim 8, wherein the IP packets are scheduled for transmission within a frame that is synchronized to a clock.

10. The method of claim 1, wherein the test packets are transmitted at a priority level that is lower than the data packets in step (3), but higher than other data packets containing other data transmitted on the network.

11. The method of claim 1, wherein the data packets comprise voice data.

12. The method of claim 1, further comprising the step of repeating steps (1) through (3) for each side of a two-way connection between two network endpoints in the network.

13. The method of claim 1, wherein the network is a packet-switched network comprising packet switches that maintain packet queues.

14. The method of claim 13, wherein each packet switch comprises at least two packet queues, a higher-priority queue for transmitting the data packets of step (3) and a lower-priority queue for transmitting the test packets of step (1).

15. The method of claim 1, wherein step (3) comprises the step of synchronously transmitting the plurality of data packets from the first network endpoint to the second network endpoint.

16. The method of claim 1, further comprising establishing the time reference frame by decomposing a time period into a plurality of smaller time periods.

17. An apparatus comprising:

a computer having a network interface and programmed with computer-executable instructions that, when executed, perform the steps of:

(1) transmitting a plurality of test packets over a single network path of a packet-switched network between a first network endpoint and a second network endpoint during a plurality of different delivery times, each delivery time corresponding to a candidate time within a time reference frame during which a packet can be transmitted from the first network endpoint to the second network endpoint;

(2) empirically determining on the basis of packet statistics of the test packets which of the plurality of different delivery times corresponds to favorable traffic conditions for transmitting packets between the first network endpoint and second network endpoint over the single network path of the packet-switched network; and (3) scheduling data packets for delivery over the network from the first network endpoint to the second network endpoint during one or more delivery times empirically determined in step (2) to correspond to favorable traffic conditions.

18. The apparatus of claim 17, wherein the test packets have characteristics emulating data packets that will be transmitted between the first network endpoint and the second network endpoint.

19. The apparatus of claim 17, wherein step (2) comprises the step of evaluating packet latencies associated with the test packets.

20. The apparatus of claim 17, wherein step (2) comprises the step of evaluating dropped packet rates associated with the test packets.

21. The apparatus of claim 17, wherein step (1) comprises the step of transmitting the test packets at a data rate corresponding to an expected connection bandwidth between the first network endpoint and the second network endpoint.

22. The apparatus of claim 17, wherein step (2) comprises the step of the first network endpoint performing an evaluation of packet statistics associated with the test packets transmitted over the plurality of different delivery times.

23. The apparatus of claim 17, wherein step (1) comprises the step of transmitting the test packets at a priority level lower than a priority level of existing real-time data traffic on the packet-switched network.

24. The apparatus of claim 17, wherein the test packets and the data packets comprise Internet Protocol (IP) packets transmitted over the packet-switched network.

25. The apparatus of claim 24, wherein the IP packets are scheduled for transmission within a frame that is synchronized to a clock.

26. The apparatus of claim 17, wherein the test packets are transmitted at a priority level that is lower than the data packets in step (3), but higher than other data packets containing other data transmitted on the network.

27. The apparatus of claim 17, wherein the data packets comprise voice data.

28. The apparatus of claim 17, wherein the network is a packet-switched network comprising packet switches that maintain packet queues.

29. The apparatus of claim 28, wherein each packet switch comprises at least two packet queues, a higher-priority queue for transmitting the data packets of step (3) and a lower-priority queue for transmitting the test packets of step (1).

30. The apparatus of claim 17, wherein step (3) comprises the step of synchronously transmitting the plurality of data packets from the first network endpoint to the second network endpoint.

31. The apparatus of claim 17, wherein the instructions when executed further establish the time reference frame by decomposing a time period into a plurality of smaller time periods.

32. A computer-readable storage medium having stored thereon executable instructions that, when executed by a computer, perform:
 (1) transmitting a plurality of test packets over a single network path of the packet-switched network between a first network endpoint and a second network endpoint during a plurality of different delivery times, each delivery time corresponding to a candidate time within a time reference frame during which a packet can be transmitted from the first network endpoint to the second network endpoint;
 (2) empirically determining on the basis of packet statistics of the test packets which of the plurality of different delivery times corresponds to favorable traffic conditions for transmitting packets between the first network endpoint and second network endpoint over the single network path of the packet-switched network; and
 (3) scheduling data packets for delivery over the network from the first network endpoint to the second network endpoint during one or more delivery times empirically determined in step (2) to correspond to favorable traffic conditions.

33. The computer-readable storage medium of claim 32, wherein the test packets have characteristics emulating data packets that will be transmitted between the first network endpoint and the second network endpoint.

34. The computer-readable storage medium of claim 32, wherein step (2) comprises the step of evaluating packet latencies associated with the test packets.

35. The computer-readable storage medium of claim 32, wherein step (2) comprises the step of evaluating dropped packet rates associated with the test packets.

36. The computer-readable storage medium of claim 32, wherein step (1) comprises the step of transmitting the test packets at a data rate corresponding to an expected connection bandwidth between the first network endpoint and the second network endpoint.

37. The computer-readable storage medium of claim 32, wherein step (2) comprises the step of the first network endpoint performing an evaluation of packet statistics associated with the test packets transmitted over the plurality of different delivery times.

38. The computer-readable storage medium of claim 32, wherein step (1) comprises the step of transmitting the test packets at a priority level lower than a priority level of existing real-time data traffic on the packet-switched network.

\* \* \* \* \*